April 23, 1957     B. H. HAMILTON     2,790,127
REGULATED RECTIFYING APPARATUS
Filed Feb. 26, 1954
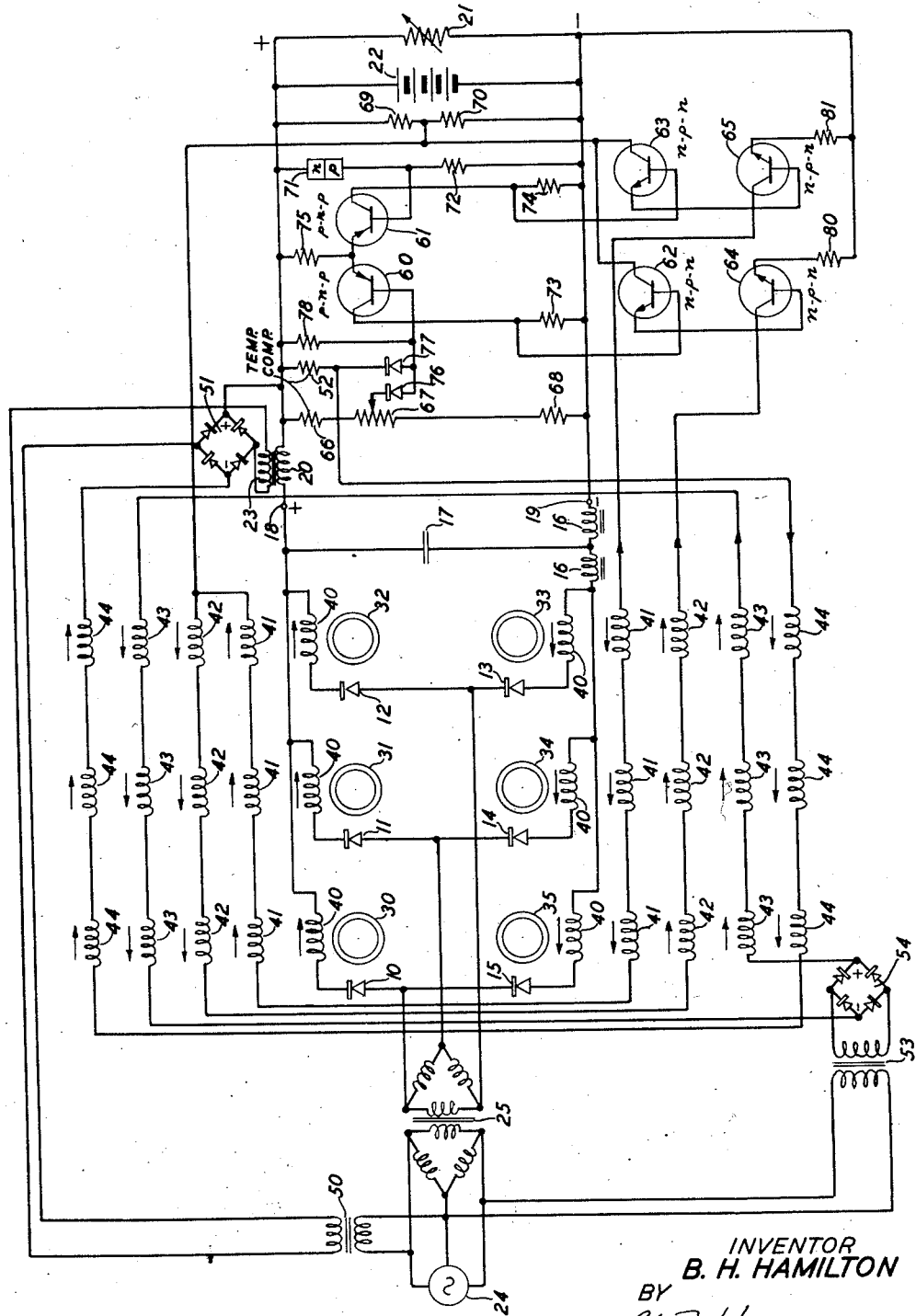
INVENTOR
B. H. HAMILTON
BY
*G. F. Heuerman*
ATTORNEY

United States Patent Office 2,790,127
Patented Apr. 23, 1957

2,790,127

REGULATED RECTIFYING APPARATUS

Billy H. Hamilton, Orange, N. J., assignor to Bell Telephone Laboratories, Incorporated, New York, N. Y., a corporation of New York Application February 26, 1954, Serial No. 412,694

5 Claims. (Cl. 321—19)

This invention relates to regulated rectifying apparatus and particularly to apparatus for regulating the rectified current supplied to a load to minimize changes of load voltage when the load current is within a normal operating range and for reducing the load voltage when the load current exceeds the normal operating current range.

An object of the invention is to provide improved regulated rectifying apparatus.

This invention is an improvement over the invention disclosed and claimed in my application Serial No. 347,344, filed April 7, 1953, now Patent No. 2,759,142, granted August 14, 1956.

In a specific embodiment of the invention herein shown and described for the purpose of illustration, a three-phase full wave rectifier is provided for supplying rectified current to a load circuit including a dissipative load and a floating battery connected across it. There are provided a plurality of saturable reactors each comprising a core of magnetic material, an impedance winding and a plurality of control or saturating windings which are energized to control the impedance of the impedance winding. The unidirectional current flowing through the rectifying elements of the multiphase rectifier is transmitted through the impedance windings respectively, to the load circuit. A transistor detector-amplifier is provided for controlling the currents supplied to a first and a second of the control windings of each reactor in response to load voltage changes under a normal load current operating condition and in response to load current changes under an abnormally high load current condition, the current in the first control winding increasing and the current in the second control winding substantially simultaneously decreasing and vice versa. Current which varies in accordance with alternating line voltage changes is supplied to a third saturating winding and current which varies in accordance with load current is supplied to a fourth saturating winding to provide line voltage and load current compounding respectively. The unidirectional currents supplied to the impedance winding and to the first and fourth control windings of each saturable reactor cause to be set up in its core aiding magnetomotive forces which are opposed by the magnetomotive forces set up by the unidirectional currents supplied to the second and third control windings. Load voltage changes are thus minimized over a normal operating range of load current and, when the current exceeds the normal operating range, the load voltage decreases abruptly as the current is increased so that load current changes are minimized.

The invention will now be described in greater detail with reference to the accompanying drawing the single figure of which is a diagrammatic view of a regulated rectifying apparatus embodying the invention.

Referring to the drawing, there is provided a full wave rectifier comprising six rectifying elements 10 to 15 inclusive for rectifying current from a three-phase alternating-current supply source 24 supplied to the rectifier through the delta connected primary and secondary windings of a transformer 25. Alternating components of the rectifier output current are suppressed by a ripple filter having series inductance elements 16 and a shunt condenser 17. The positive output terminal 18 and the negative output terminal 19 of the rectifier and filter are connected to a load circuit which comprises the winding 20 of a saturable reactor in series with a load which includes the resistive load 21 and a floating battery 22 connected across it. The reactor also has an impedance winding 23 the impedance of which is controlled by the amplitude of the load current flowing through the saturating winding 20.

There are provided six saturable reactors having cores 30 to 35 inclusive of magnetic material. Five windings are wound on each of the cores 30 to 35, the windings on each core being identified by the numerals 40 to 44 inclusive. The impedance windings 40 associated with the cores 30, 31 and 32 are connected in series with the rectifying elements 10, 11 and 12, respectively, to the positive output terminal 18. The impedance windings 40 associated with the cores 33, 34 and 35 are connected in series with the rectifying elements 13, 14 and 15, respectively. The current supplied to the load circuit is controlled by the impedance of each of the windings 40. The impedance of each winding 40, in turn, is determined by the flux in the core on which the winding 40 is wound and, therefore, by the resultant of the magnetomotive forces set up in the core by the unidirectional currents supplied to the windings 40 to 44 inclusive. The relative directions of the magnetomotive forces set up in each core by the currents supplied to the windings 40 to 44, respectively, are indicated by the arrows in the drawing. It will be seen that the aiding magnetomotive forces set up by the currents in windings 40, 41 and 44 are opposed by the magnetomotive forces set up by the currents in windings 42 and 43.

Current is supplied from one of the phases of the supply source 24 to the primary winding of a transformer 50 the secondary winding of which is connected through the impedance winding 23 to the input terminals of a bridge rectifier 51. The rectifier 51 supplies unidirectional current from its output terminals to a circuit comprising a resistor 52 and the windings 44, all in series. Thus, the current supplied to the windings 44 is proportional to load current and the voltage drop across resistor 52 is proportional to load current. Current is supplied from one of the phases of the supply source 24 through a transformer 53 to the input terminals of a rectifier 54. The rectifier 54 supplies unidirectional current to the windings 43, all in series. The current supplied to the windings 43 is thus proportional to the line voltage.

The unidirectional currents supplied to the windings 41 and 42 are controlled by a control circuit comprising the p-n-p type transistors 60 and 61 and the n-p-n type transistors 62, 63, 64 and 65. Three current paths are connected across the load. One of the paths comprises a resistor 66, a potentiometer 67 and a resistor 68 in series. Another of the current paths comprises resistors 69 and 70 in series. The third current path comprises a p-n junction diode 71 and a resistor 72 in series. The resistance of the resistor 72 is such that the current flowing through the diode 71 exceeds the so-called avalanche breakdown point with the result that the voltage drop across the diode remains substantially constant irrespective of variations of the current flowing through it. P-n junction diodes and their characteristics are disclosed in an application of W. Shockley, Serial No. 211,212, filed February 16, 1951, now Patent No. 2,714,702, granted August 2, 1955.

The collectors of transistors 60 and 61 are connected through resistors 73 and 74, respectively, to the negative load terminal. The emitters of transistors 60 and 61 are connected through a resistor 75 to the positive load terminal. The base of transistor 61 is connected to the common terminal of diode 71 and resistor 72. The base of transistor 60 is connected through a rectifying element 76 to the variable tap of potentiometer 67. The base of transistor 60 is also connected through a rectifying element 77 and resistor 52 in series to the positive load terminal. The base of transistor 60 is also connected through a resistor 78 to the positive load terminal. The bases of transistors 62 and 63 are connected to the collectors of transistors 60 and 61, respectively. The collectors of transistors 62 and 63 are connected to the common terminal of resistors 69 and 70. The emitters of transistors 62 and 63 are connected to the bases of transistors 64 and 65, respectively. The emitters of transistors 64 and 65 are connected through resistors 80 and 81, respectively, to the negative load terminal. The common terminal of resistors 69 and 70 is connected through the windings 41 in series to the collector of transistor 65 and said common terminal is connected through the windings 42 in series to the collector of transistor 64.

Current flows from the positive load terminal through resistor 75 into the emitter and out of the collector of transistor 60 and through resistor 73 to the negative load terminal. A portion of the current flowing into the emitter of transistor 60 flows out of its base and through the diode 76, through a portion of the resistance of potentiometer 67 and through resistor 68 to the negative load terminal. Current also flows through resistor 75 into the emitter and out of the collector of transistor 61 and through the resistor 74 to the negative load terminal. A portion of the current flowing into the emitter of transistor 61 flows out of the base and through the resistor 72 to the negative load terminal. Current flows through the resistor 69 of the voltage divider 69, 70 into the collector and out of the emitter of transistor 62, through the base-emitter junction of transistor 64 and through resistor 80 to the negative load terminal. Current flows through resistor 69, through windings 41 in series into the collector and out of the emitter of transistor 65 and through resistor 81 to the negative load terminal. Similarly, current flows through resistor 69, through windings 42 in series into the collector and out of the emitter of transistor 64 and through resistor 80 to the negative load terminal.

When the load current is within a normal operating range, an increase of load voltage, for example, will make the base potential of transistor 60 more negative with respect to the potential of the positive load terminal so that an increase of current flowing through resistor 75 into the emitter and out of the base of transistor 60 will result. Therefore, the resulting increased voltage drop across resistor 75 will cause a reduction of the current flowing into the emitter and out of the base of transistor 61. Thus, the collector current of transistor 60 flowing through resistor 73 will increase and the collector current of transistor 61 flowing through resistor 74 will decrease. The increased voltage drop across the resistor 73 will cause the currents flowing through the emitter-base junctions and the collector-base junctions of transistors 62 and 64 to increase. The decreased voltage drop across the resistor 74 will cause the currents flowing through the emitter-base junctions and the collector-base junctions of transistors 63 and 65 to decrease.

The current supplied from rectifier 54 to the windings 43 sets up a biasing magnetomotive force in each of the cores 30 to 35. The magnetomotive force due to the current supplied to windings 42 aids the biasing magnetomotive force, and the magnetomotive force due to the current supplied to windings 41 opposes the biasing magnetomotive force. Therefore, the increased current flowing through the windings 42 and the decreased current flowing through windings 41 will increase the magnetomotive force in each core in the direction of the biasing magnetomotive force. The biasing magnetomotive force due to current in each winding 43 is opposed to the magnetomotive force set up by the rectified current flowing through each winding 40. The increase of magnetomotive force in the direction of the biasing magnetomotive force therefore increases the impedance of each of the windings 40. The current supplied by the rectifier through the windings 40 to the load circuit is thereby decreased, thus minimizing the initially assumed rise of load voltage. A reduction of load voltage causes the current through windings 42 to decrease and the current through windings 41 to increase. The magnetomotive force set up in each core in opposition to the magnetomotive force due to the current in windings 40 will therefore decrease, the impedance of each winding 40 will decrease and the current supplied to the load circuit will increase. The assumed reduction of load voltage will thus be minimized.

The load voltage regulation is improved by providing line voltage compounding and load current compounding. The current supplied by rectifier 54 to the biasing windings 43 increases in response to an increase of the line voltage from source 24 and vice versa. If the current supplied to the windings 43 increases in response to an increase of line voltage, for example, the impedance of windings 40 is increased. The increased impedance of windings 40 tends to prevent a rise of load voltage in response to the increase of line voltage.

Current from the rectifier 51 is supplied through resistor 52 to the windings 44 in series. This current increases in response to an increase of load current because the increased load current flowing through saturating winding 20 decreases the impedance of winding 23 of the reactor 20, 23. The magnetomotive force set up in each core by the current in winding 44 is in opposition to the biasing magnetomotive force set up by the current in winding 43. Therefore, an increase of current supplied to the windings 44 in response to an increase of load current decreases the impedance of each winding 40. The tendency of the load voltage to decrease in response to an increase of load current is thus reduced or substantially prevented.

The voltage drop between the positive load terminal and the variable tap of potentiometer 67 is proportional to the load voltage, and the voltage drop across the resistor 52 is proportional to the load current. The resistance of resistor 52 is adjusted so that at full load, or the maximum current of the normal operating range, the voltage across resistor 52 is substantially equal to the voltage across resistor 66 and the portion of potentiometer 67 between its variable tap and the common terminal of resistor 66 and potentiometer 67. When the load current is less than full load current, the voltage between the positive load terminal and the variable tap of potentiometer 67 is larger than the voltage across resistor 52, current flows through resistor 78, rectifying element 76 in its forward direction, a portion of potentiometer 67 and resistor 66 all in series, and current is prevented from flowing through rectifying element 77 in its forward direction. For this condition the voltage across resistor 78 is proportional to load voltage and, therefore, the current through windings 42 increases and the current through windings 41 decreases in response to an increase of load voltage and vice versa, as described above. However, when the load current increases to a value larger than the maximum normal load current, the voltage across resistor 52 becomes larger than the voltage across resistor 66 and a portion of potentiometer 67 and as a result current flows through resistor 78, the rectifying element 77 in its forward or low resistance direction and resistor 52 and there is thus set up across resistor 78 a voltage proportional to load current. For this condition, current is prevented from flowing through the rectifying element 76 in its forward or low resistance direction. Therefore, an increase of voltage across resistor 78, produced by an increase of load current, increases the current through windings 42 and decreases the current through windings 41 to cause the impedance of each winding 40 to increase. The voltage drop across each winding 40 due to the pulsating rectified current flowing therethrough, is thus increased to cause a reduction of the rectifier output voltage across terminals 18, 19. It is seen, therefore, that the regulating apparatus comprising transistors 60 to 65 inclusive for controlling the currents supplied to windings 41 and 42 functions to maintain the load voltage substantially constant when the load current is within a normal operating range and to limit the output voltage of the rectifier to minimize changes of load current when the load current increases to a value larger than the maximum current of the normal operating current range.

The voltage across the p-n junction diode 71 increases about 0.035 percent per degree centigrade increase in ambient temperature. If no temperature compensation were provided, the rise of voltage across the diode 71 in response to an increase of ambient temperature would cause an increase of current flowing through windings 41 and a decrease of current flowing through windings 42, the impedance of windings 40 would therefore decrease to cause the load voltage to rise. This undesired result is avoided by employing resistors 66 and 52 each having a positive temperature coefficient of resistance. The temperature coefficient of resistance of resistors 66 and 52 is made such that an increase of ambient temperature, for example, produces an increase of voltage across resistor 78 equal to the voltage increase across the diode 71. Then the resulting current increase in windings 42 will equal the current increase of windings 41 and the impedance of windings 40 will not be affected by the assumed increase of ambient temperature.

What is claimed is:

1. In combination, a saturable electromagnetic device having an impedance winding and a plurality of saturating windings for controlling the impedance of said impedance winding, means for supplying rectified alternating current through said impedance winding to a load circuit including a load which may vary, means for minimizing changes of load voltage when the load current is within a normal operating range including a certain maximum current value comprising a first control means responsive to load voltage changes for controlling the energization of one at least of said saturating windings and a second control means responsive to load current changes for controlling the energization of another of said saturating windings, and means for reducing the load voltage when the load current is larger than said maximum value comprising means for rendering said first control means responsive to load current changes and simultaneously unresponsive to load voltage changes.

2. Apparatus for rectifying current from an alternating-current supply source and for supplying said rectified current to a load circuit including a load which comprises a saturable reactor having a core, an impedance winding and three saturating windings which are energized to control the impedance of the impedance winding, means for transmitting said rectified current through said impedance winding to said load circuit, means for supplying to a first of said saturating windings a direct current which varies in response to load current changes, means for supplying to a second of said saturating windings a direct current which varies in response to voltage changes of said alternating-current supply source and means for supplying to the third of said saturating windings a current which varies in response to load voltage changes when the load current has an amplitude below a predetermined value and which varies in response to load current changes when the load current has an amplitude above said predetermined value.

3. Apparatus in accordance with claim 2 in which the magnetomotive force set up in said core by the current supplied to said first saturating winding aids the magnetomotive force due to the rectified current flowing through said impedance winding and in which the magnetomotive forces set up by the currents supplied to said second and third saturating windings, respectively, oppose the magnetomotive force due to the rectified current flowing through said impedance winding.

4. In combination a first saturable reactor having a first impedance winding and a first saturating winding to which current may be supplied for controlling the impedance of said first impedance winding, a second saturable reactor having a second impedance winding and a second saturating winding for controlling the impedance of said second impedance winding, a first means for rectifying current from an alternating-current supply source, means for supplying the rectified current through said first impedance winding and through said second saturating winding in series to a load circuit including a load, a first and a second resistance means, a second means for rectifying current from said alternating-current supply source, means for supplying current from said second rectifying means through said second impedance winding to said first resistance means, thereby setting up a first unidirectional voltage across said first resistance means, a current path comprising said second resistance means connected across said load, thereby setting up a second unidirectional voltage across said second resistance means, means for supplying unidirectional current to said first saturating winding and means responsive to the larger voltage only of said first and second unidirectional voltages for controlling the current supplied to said first saturating winding.

5. In combination, a first saturable reactor having a first, a second, a third, a fourth and a fifth winding on a core of magnetic material, a second saturable reactor having a sixth and a seventh winding on a core of magnetic material, a first rectifier for supplying rectified current from an alternating-current supply source through said first and sixth windings in series to a load circuit including a load, a second rectifier for supplying rectified current from said supply source to said second winding, a first resistor, a third rectifier for supplying rectified current from said supply source to a circuit comprising said seventh winding, said first resistor and said third winding all in series, thereby setting up a first voltage across said first reistor, a first current path comprising resistance means connected across said load, thereby setting up a second voltage across said resistance means, a second resistor, a fourth and a fifth rectifier, a second, a third and a fourth current path connected in parallel, said second path comprising said resistance means and said fourth rectifier in series, said third current path comprising said first resistor and aid fifth rectifier in series and said fourth current path comprising said second resistor, said fourth and fifth rectifiers being so poled that there is set up across said second resistor a third voltage substantially equal to the larger of said first and second voltages, a fifth current path comprising a p-n junction diode and a resistor in series connected across said load circuit to set up across said diode a fourth voltage which is substantially constant when the ambient temperature is constant but which increases in response to an increase of ambient temperature, said first resistor and said resistance means each having a positive temperature coefficient of resistance such that said third and fourth voltages change substantially equally in response to a change of ambient temperature, a third resistor, a first and a second transistor each having a collector, an emitter and a base, a circuit comprising said second and third resistors in series connecting the base and the emitter of said first transistor, a circuit comprising said diode and said third resistor in series connecting the base and the emitter of said second transistor, a transistor amplifier having amplifying changes of the collector current of said first transistor and for supplying the amplified current to said fourth winding and a transistor amplifier for amplifying changes of the collector current of said second transistor and for supplying the amplified current to said fifth winding, the currents supplied to said third and fifth windings setting up in the core of said first saturable reactor magnetomotive forces which aid the magnetomotive force set up due to the current supplied to said first winding, the currents supplied to said second and fourth windings setting up in the core of said first saturable reactor magnetomotive forces which oppose the magnetomotive force due to the current supplied to said first winding.

References Cited in the file of this patent
UNITED STATES PATENTS

| | | |
|---|---|---|
| 2,431,311 | Cronvall | Nov. 25, 1947 |
| 2,549,782 | Engelman | Apr. 24, 1951 |
| 2,552,952 | Gachet et al. | May 15, 1951 |